United States Patent [19]
Tada et al.

[11] Patent Number: 5,771,177
[45] Date of Patent: Jun. 23, 1998

[54] METHOD AND APPARATUS FOR MEASURING DYNAMIC LOAD

[75] Inventors: Eiichi Tada, Osaka; Kazuo Watanabe, Amagasaki, both of Japan

[73] Assignee: Kyoei Automatic Control Technology Co., Ltd., Hyogo, Japan

[21] Appl. No.: 373,201

[22] PCT Filed: May 16, 1994

[86] PCT No.: PCT/JP94/00790

§ 371 Date: Jan. 13, 1995

§ 102(e) Date: Jan. 13, 1995

[87] PCT Pub. No.: WO94/27122

PCT Pub. Date: Nov. 24, 1994

[30] Foreign Application Priority Data

May 17, 1993 [JP] Japan .................................. 5-139531

[51] Int. Cl.⁶ .............................. G01G 9/00; G06F 19/00
[52] U.S. Cl. ............................ 364/506; 73/865; 364/550
[58] Field of Search ............................... 73/11.01, 12.01, 73/12.04, 865; 364/506, 550

[56] References Cited

U.S. PATENT DOCUMENTS

| | | | |
|---|---|---|---|
| 3,323,370 | 6/1967 | Green et al. ............................. | 73/865 |
| 3,800,893 | 4/1974 | Ramsay et al. ..................... | 73/862.634 |
| 4,240,289 | 12/1980 | Saner ................................. | 73/862.59 |
| 4,881,172 | 11/1989 | Miller .............................. | 364/424.046 |
| 5,442,960 | 8/1995 | Solberg, Jr. ............................. | 73/580 |
| 5,526,697 | 6/1996 | Tada et al. ............................ | 177/25.14 |

FOREIGN PATENT DOCUMENTS

| | | |
|---|---|---|
| 93/05371 | 3/1993 | WIPO . |
| WO 93/05374 | 3/1993 | WIPO . |

Primary Examiner—Edward R. Cosimano
Attorney, Agent, or Firm—Burns, Doane, Swecker & Mathis, L.L.P.

[57] ABSTRACT

A method and apparatus for measuring the mass of a dynamic load without being influenced by vibration caused by the apparatus itself or the environment. A dynamic load sensor that supports the dynamic load is periodically and continuously reciprocated in at least one predetermined direction. Within the dynamic load sensor, one end of a member comprising a spring system is fixed to a base of a non-spring system, the other end of the spring system is free. A load is applied to the free end of the spring system. The base is continuously and periodically agitated along with the spring system. A displacement of the base $y_1$ and a displacement $y_2$ of the free end of the spring mass system are continuously measured. By obtaining the first-order derivatives $\dot{y}_1$ and $\dot{y}_2$ and the second-order derivatives $\ddot{y}_1$ and $\ddot{y}_2$ from said displacements $y_1$ and $y_2$ with respect to time, the mass of the load, m, can be calculated by the equation:

$$m[\ddot{y}] = mg - [(mg + kf_2(y - y_1 + y_2)) - f_3(\dot{y} - \dot{y}_1 + \dot{y}_2) + f_1(m\ddot{y}_1, m\ddot{y}_2)]$$

where the symbol [ ] represents a matrix whose determinant is (a number of degrees of member freedom×a number of data measurements), g is gravitational acceleration, $kf_2(y - y_1 + y_2)$ is a material term of the component structure of the spring mass system, k is a spring constant, $f_3(\dot{y} - \dot{y}_1 + \dot{y}_2)$ is a damping term selected from the group consisting of: viscous friction, coulomb, hysteresis, fluid drag and fluid mass drag damping, and $f_1(m\ddot{y}_1, m\ddot{y}_2)$ is a resultant time-varying forces term acting on the object having the mass m.

6 Claims, 19 Drawing Sheets

METHOD AND APPARATUS FOR MEASURING DYNAMIC LOAD

FIELD OF THE INVENTION

The present invention relates to a method and an apparatus for a dynamic load measurement suitable for time-varying forces under dynamic states excited by shaking, oscillating and/or vibrating conditions, such as measuring a load when that load is varying during measuring by fluid flowing, and measuring a load for moving objects such as live fish, and for a time-varying place or base such as sailing vessels, flying airplanes, conveyers and so on, and for running vehicles and so on.

BACKGROUND OF THE INVENTION

Up to now, many ideas have been proposed about a load measurement of a time-varying force under dynamic states excited by shaking, oscillating and/or vibrating conditions. However, conventional load measurement methods and equipment measure a static force or a quasi-dynamic force at measuring state conditions, with a long range period on the order of 1 second, and with a small acceleration which must be less than one G. Such conventional dynamic load measurements are within a range of a static load measurement.

The present inventors proposed a dynamic load sensing method, a dynamic load analyzing sensor and a dynamic load measurement equipment beyond a range of a static load and/or a quasi-dynamic load measurement in PCT/JP91/01168 (WO93/05374) and PCT/JP92/01094 (WO93/05371).

SUMMARY OF THE INVENTION

The present invention is a method and an apparatus for measuring a dynamic load which is not affected by shaking, oscillating and/or vibrating conditions excited by the apparatus itself and the external environment, using by much more improved on the above dynamic load sensing method, the above dynamic load analyzing sensor, and the above dynamic load measurement equipment.

The method for measuring a dynamic load concerned in the present invention involves the use of an arrangement in which one end part of a component structure including a spring mass system or fixed to the based composed of a non-spring mass system. The other end part of the component structure is free, working a load at the free end part of said component structure composed by the spring mass system. In the method, the base is made to periodically and continuously move, vibrate and/or undergo resultant motion together with said component structure composed by the spring mass system. Here and elsewhere herein it will be understood that 'moving' or 'vibrating' is defined as a time-varying motion including moving and vibrating motions and their resultant motions), measuring continuously a displacement $y_1$ of said base and a displacement $y_2$ of said free end part of said component structure, obtaining the first-order derivatives $\dot{y}_1$ and $\dot{y}_2$ and the second-order derivatives $\ddot{y}_1$ and $\ddot{y}_2$ with respect to time from said displacements $y_1$ and $y_2$, and calculating a mass m of said load using the following equation:

$$m[\ddot{y}]=mg-[(mg+kf_2(y-y_1+y_2))-f_3(\dot{y}-\dot{y}_1+\dot{y}_2)+f_1(m\ddot{y}_1,m\ddot{y}_2)]$$

(where the symbol [ ] represents a (degree of freedom× number of data) measurement matrix, g being the gravitational acceleration, $kf_2(y-y_1+y_2)$ being the material term of the component structure of the spring mass system; k being a spring constant, $f_3(\dot{y}-\dot{y}_1+\dot{y}_2)$ being the damping term such as viscous friction, coulomb, hysteresis, fluid drag or fluid virtual mass drag damping; and $f_1$ ($m\ddot{y}_1$, $m\ddot{y}_2$) being the resultant time-varying forces term acting on the object having mass m).

The apparatus for measuring a dynamic load of the present invention comprises a base that includes a non-spring mass system; a frame body which includes a spring mass system having one end part fixed to base, and having an other end part that is free; a first displacement sensor for measuring a displacement $y_1$ of the base as excited by vibrations and oscillations at a fixed end part of the frame body; a second displacement sensor for measuring a displacement $y_2$ of the free end part of the frame body; an analyzing unit by which a mass of a load acting on the free end part is calculated using the displacements $y_1$ and $y_2$; and a vibrating means which makes the base periodically and continuously vibrate together with said frame body and the first and the second displacement sensors. The analyzing unit calculated the first-order derivatives $\dot{y}_1$ and $\dot{y}_2$ and the second-order derivatives $\ddot{y}_1$ and $\ddot{y}_2$ with respect to time from the displacements $y_1$ and $y_2$. A mass m of the load is calculated from the following equation:

$$m[\ddot{y}]=mg-[(mg+kf_2(y-y_1+y_2))-f_3(\dot{y}-\dot{y}_1+\dot{y}_2)+f_1(m\ddot{y}_1,m\ddot{y}_2)]$$

(where the symbol [ ] represents a (degree of freedom× number of data) measurement matrix; g being the gravitational acceleration; $kf_2(y-y_1+y_2)$ being the material term of the component structure of the spring mass system; k being a spring constant; $f_3(\dot{y}-\dot{y}_1+\dot{y}_2)$ being the damping term such as viscous friction, coulomb, hysteresis, fluid drag and fluid virtual mass drag damping; or $f_1(m\ddot{y}_1, m\ddot{y}_2)$ being the time-varying force term acting on the object having mass m).

The first and the second displacement sensors comprise a light-emitting element, a one dimensional position detection element which provides a pair of semiconductor pin-photo diode elements (hereinafter referred to as a PPD), and a spring-bar element inserted into a portion between the light-emitting element and the one dimensional position detection element. One of two pairs of the light-emitting elements and the one dimensional position detection elements is set up at the free end part of the frame body, the other being set up at the fixed end part of the frame body. One edge of the spring-bar element is fixed to a free end part or fixed end part of the frame body, thereby masking a portion of the one dimensional position detection element. The one dimensional position detection element detects an intensity of incident light from the light-emitting element in proportion with a vibration of the spring-bar. The vibrating means vibrates the base in a direction of working a load to the free end part of the component structure composed by a spring mass system.

In an apparatus as shown in FIG. 17, a base composed by a non-spring mass system, and a sensor assembly (A) having a beam shape composed by a spring mass system on the base, are varying, vibrating and oscillating. A base B is vibrating with an acceleration $\ddot{y}_1$ and a free end part of the sensor assembly A is vibrating against the base B with an acceleration $\ddot{y}_2$. Assuming that the base B is fixed, an instant measuring load $W_i$ is calculated from the law of motion, by the equation, $$W_i = m(g + \ddot{y}_2) = W_e(1 + \ddot{y}_2/g)$$

where $W_e$ (=mg) is the rest load (N) of a measuring object C, and m being the mass (Kg) of the object.

Using by the above relation, the rest load $W_e$ (N) is calculated from the following equation, $$We = \frac{W_i}{(1 + \ddot{y}_2/g)} = \frac{W_i g}{g + \ddot{y}_2}$$

The equation of the instant measuring load $W_i$, as shown above is derived by D'Alambert's dynamic equilibrium. However, this dynamic equilibrium is a completely idealized equation. The actual equation should take the component materials and structural configurations into consideration. In general, the undamped one-degree spring mass system is subjected to a general type force function F(t). The differential equation of motion derived by the law of motion is as follows, $$m\ddot{y} + ky = F(t)$$

In the spring mass system as shown in FIG. 18(A), the initial condition is at a time when the system is in its equilibrium position $y_e$, that is the displacement derived by the rest load. The equation of motion is as follows, $$F(t) = m\ddot{y} - m\ddot{y}_e + k(y - y_e)$$

In FIG. 18(A) $y_i$ is an instant displacement against an instant load $W_i$ exited by time varying forces. Thus the expression for F(t) can be written as, $$F(t) = W_i - W_e$$

Thus the two above equations yield, $$m\ddot{y}_i - m\ddot{y}_e + k(y_i - y_e) = W_i - W_e$$

In this equation, hence the displacement $y_e$ is constant, the acceleration is, $$\ddot{y}_e = 0$$

The above equation can now be expressed, $$m\ddot{y}_i + k(y_i - y_e) = W_i - W_e$$

This equation can be reformed as, $$We\frac{\ddot{y}_i}{g} + k(\ddot{y}_i - y_e) = W_i - W_e$$

According to FIG. 18(B), $$W_e\frac{\ddot{y}_i}{g} + k(y_i - y_e) = W_i - W_e$$

Thus, $$y_i - y_e = y_i - y_e\frac{g}{(g + \ddot{y}_i)} = y_i\left(\frac{\ddot{y}_i}{g + \ddot{y}_i}\right)$$

Therefore, by substituting this relation into the equation of $W_e$, $$We\frac{\ddot{y}_i}{g} + k(y_i - y_e) = W_i - W_e$$

By simplifying, $$We = \frac{W_i g}{g y_i} - \frac{k \cdot y_i \cdot g \cdot \ddot{y}_i}{(g + \ddot{y}_i)^2}$$

However in case of FIG. 17, the free end part of the sensor assembly A is vibrating with the acceleration $\ddot{y}_{2i}$ against the base B. In this case, by substituting $(\ddot{y}_{2i} - \ddot{y}_{1i})$ into $y_i$ of the equation of the case of the base B being still, the above equation, $$m\ddot{y}_i - m\ddot{y}_e + k(y_i - y_e) = W_i - W_e$$

can be expressed as $$m(\ddot{y}_{2i} - \ddot{y}_{1i}) + k(y_{2i} - y_{1i}) = m(g + \ddot{y}_{1i} - \ddot{y}_{1i})$$

By simplifying, $$We = \frac{W_i g}{g + y_{2i} - y_{1i}} - \frac{k \cdot y_{2i} \cdot g \cdot (\ddot{y}_{2i} - \ddot{y}_{1i})}{(g + \ddot{y}_{2i} - \ddot{y}_{1i})^2}$$

As a result, the rest load $W_e$ can be calculated by computing the acceleration $\ddot{y}_{1i}$ from the displacement $y_{1i}$ of the base B and by computing the instant load $W_i$ and the acceleration $\ddot{y}_{2i}$ from the displacement $y_{2i}$ of the sensor assembly A. By generating tables of the relation between rest loads $W_e$ and displacements $y_1$ and $y_2$, respectively, it is easy to transform displacements $y_1$ and $y_2$ to instant loads $W_i$. An instant load $W_i$ also can be calculated using Hook's law by using the spring constant k. The spring constant k can be determined by a shape, configuration and material of the component structure of composed the sensor assembly A.

The above principle does not account for vibration and disturbance excited by the apparatus itself and an external environment. The actual time series data equation should take a time relation into consideration, wherein a time relation is referred by the inertia term, the motion being continuous.

In this present invention, by making the base B move and vibrate continuously together with the sensor assembly A, measuring time series data, and analyzing the time series data, it is possible to exclude the influence of the disturbance for a displacement measurement of the sensor assembly A and the base B.

In FIG. 19, the sensor assembly A of the base environment and the measuring object C undergo three-dimensional motion. There is an external vibration source point k (k= 1, ,N) outside the sensor assembly A, where a vibration wave is $\xi_k(t)$, a velocity wave being $\dot{\xi}_k(t)$, and a acceleration wave being $\ddot{\xi}_k(t)$.

The vibration wave $\dot{\xi}_k(t)$ acting on the sensor assembly A from the external vibration source point k is given by the expressions, $\xi'_k(t) = \lambda_k \xi_k(t)$ $\dot{\xi}'_k(t) = \lambda_k \dot{\xi}_k(t)$ $\ddot{\xi}'_k(t) = \lambda_k \ddot{\xi}_k(t)$ where $\lambda_k$ is a damping function and is dependent on a distance between the vibration source point k and the sensor assembly A, a propagation path, a propagation medium, and a vibration frequency $\lambda_k$ is given by the expression, $$\lambda_k \propto f$$

In the case of the sensor assembly A itself vibrating, a vibration wave is $y(t)$, a velocity wave is $\dot{y}(t)$, and an acceleration wave is $\ddot{y}(t)$. FIG. 20 shows the acceleration spectrum and the acceleration power spectrum of the vibrating condtion of the system depicted in FIG. 19.

The vibration wave acting on the sensor assembly A is, $$y_1(t) = Y(t) + \sum_{k=1}^{N} \lambda_k \xi_k(t)$$

The velocity wave is, $$\dot{y}_1(t) = \dot{Y}(t) + \sum_{k=1}^{N} l_k \dot{x}_k(t)$$

An external force acting on the measuring object C (mass is m) is given as follows, $$m\ddot{y}_1(t) = m\ddot{Y}(t) + m \sum_{k=1}^{N} l_k \ddot{x}_k(t)$$

The spectrum of the vibration wave, that is, the energy spectrum versus the vibration frequency (t;time, $0 \leq t \leq T$) is as follows respectively, $$S_\xi(\omega) = \lim_{T \to \infty} \frac{1}{T} \left| \int_{-\infty}^{\infty} \left( \sum_{k=1}^{N} \lambda_k \ddot{\xi}_k(t) \right) e^{j\omega t} dt \right|^2$$

$$S_y(\omega) = \lim_{T \to \infty} \frac{1}{T} \left| \int_{-\infty}^{\infty} \ddot{Y}(t) e^{j\omega t} dt \right|^2$$

Then, $$\alpha = \frac{m \sum_{k=1}^{N} \lambda_k \ddot{\xi}_k(t)}{m\ddot{y}(t)} = \frac{\sum_{k=1}^{N} \lambda_k \ddot{\xi}_k(t)}{\ddot{y}(t)}$$

where ($S_\xi(\omega)$ and $S_y(\omega)$ are finite.)

Here the ratio of the force excited by the motion of the sensor assembly A to the force of vibration disturbances is defined by the following equation, $$\alpha = \frac{m \sum_{k=1}^{N} \lambda_k \ddot{\xi}_k(t)}{m\ddot{y}(t)} = \frac{\sum_{k=1}^{N} \lambda_k \ddot{\xi}_k(t)}{\ddot{y}(t)}$$

In order to exclude the external vibration terms, the force condition, $\alpha \ll 1$, and the energy condition, $\alpha^2 \ll 1$. As a result, assuming making that the motion of the sensor assembly A is larger than the external vibration terms, it is possible to stably measure a dynamic load.

Consider, for example, a spring mass system having one degree of freedom as shown in FIG. 21, whose mass m is restricted to act on the sensor assembly A in accordance with the vibration with the base B. The time varying force acting on the base B having object mass m, supported by the damper C, and the spring k, is $P_0 \sin \omega_p t$.

$$y = y_p \cos(\omega_p t - \delta)$$

At the same time, the external time varying forces acting on the object from the spring k and the damper C is as follows, $$\sum_{i=1}^{N} Q_i \sin \omega_{Q_i} t$$

The differential equation of motion for this system is derived from the next relation, $$m\ddot{y} + k(y - y_1) + C(-\dot{y}_1) = P_0 \sin \omega_p t$$

simplifying, $$m\ddot{y} + k\dot{y} + Cy = C\dot{y}_1 + ky_1 + P_0 \sin \omega_p t$$

where, $$C\dot{y}_1 + ky_1 = \sum_{i=1}^{N} Q_i \sin \omega_{Q_i} t$$

The amplitude by the impressed force $P_0$ is, $$y_0 = \frac{P_0/k}{\sqrt{\left(1 - \frac{\omega_p}{\omega_n^2}\right)^2 + \left(2\frac{C}{C_c} \cdot \frac{\omega_p}{\omega_n}\right)^2}} + \sum_{i=1}^{N} \frac{Q_i/k}{\sqrt{\left(1 - \frac{\omega_p}{\omega_n^2}\right)^2 + \left(2\frac{C}{C_c} \cdot \frac{\omega_p}{\omega_n}\right)^2}}$$

$$= P_0/k \left\{ \frac{1}{\sqrt{\left(1 - \frac{\omega_p}{\omega_n^2}\right)^2 + \left(2\frac{C}{C_c} \cdot \frac{\omega_p}{\omega_n}\right)^2}} + \sum_{i=1}^{N} \frac{Q_i/P_0}{\sqrt{\left(1 - \frac{\omega_p}{\omega_n^2}\right)^2 + \left(2\frac{C}{C_c} \cdot \frac{\omega_p}{\omega_n}\right)^2}} \right\}$$

FIG. 22 shows the concept drawing of the spring mass system exited by the force P(t) by the motion of the base B and the forces Qi(t). In this case, the influence effect of the external disturbance for the impressed force term Po is calculated from the follwing relation, $$\frac{\lambda_i Q_i}{P_0} = \frac{Q_i}{P_0} \cdot \lambda_i = \frac{Q_i}{P_0} \sqrt{\frac{1 + \left(2\frac{C}{C_c} \cdot \frac{\omega_p}{\omega_n}\right)^2}{\left(1 - \frac{\omega_p}{\omega_n^2}\right)^2 + \left(2\frac{C}{C_c} \cdot \frac{\omega_p}{\omega_n}\right)^2}}$$

where $C_c$ is the critical damping constant, and $\omega_n^2$ is the natural frequency.

$$C_c = 2m\omega_n = 2\sqrt{mk}$$

$$\omega_n^2 = \frac{k}{m} = \left(\frac{C}{2m}\right)^2$$

Assuming that the dynamic condition of the base B is satisfied with the following relation, it is possible to exclude the external disturbance and to measure only the motion of the base B by the sensor assembly A. The assumption condition is that $Q_1/P_0 \ll 1$, excluding the amplitude by the impressed force, the above equation becomes, $$y_0 = \frac{P_0/k}{\sqrt{\left(1 - \frac{\omega_p}{\omega_n^2}\right)^2 + \left(2\frac{C}{C_c} \cdot \frac{\omega_p}{\omega_n}\right)^2}}$$

This relation indicates that the force of the base B is larger than the force of any disturbances.

The internal vibration force $m\ddot{y}_2$, excited by the vibration of the motion of the measuring object C itself, is given as follows, $$m\ddot{y}_2(t) = m \sum_{k=1}^{M} \ddot{\eta}_k(t)$$

The ratio of force excited by the motion of the sensor assembly A to the force of vibration of the measuring object itself is defined by the following equation, $$\beta = \frac{m \sum_{k=1}^{M} \ddot{\eta}_k(t)}{mY(t)} = \frac{\sum_{k=1}^{M} \ddot{\eta}_k(t)}{Y(t)}$$

It is possible to exclude the influence of the motion of the measuring object itself. It is also possible to exclude the influence of the motion of the measuring object itself in the case of the object C that causes the base B vibrate.

By satisfying the above condition, the time series data measuring by the sensor assembly A is calculated from the following equation, $$m\ddot{y} = mg - (mg + kf_2(y - y_1 + y_2)) - f_3(\dot{y} - \dot{y}_1 + \dot{y}_2) + f_1(m\ddot{y}_1, m\ddot{y}_2)$$

where $y_1$ is a measuring displacement of the base B, and is $y_2$ is a displacement of the free end part of the sensor assembly A against the base B, as above mentioned. Measuring $y_1$ and $y_2$, a material term $kf_2(y-y_1+y_2)$, a damping term $f_3(\dot{y}-\dot{y}_1+\dot{y}_2)$ and a force term $f_1(m\ddot{y}_1, m\ddot{y}_2)$ are calculated from the above measuring data, where $kf_2(y-y_1+y_2)$ is the material term of the component structure of the spring mass system, k is a spring constant, $f_3(\dot{y}-\dot{y}_1+\dot{y}_2)$ is the damping term such as viscous friction, coulomb, hysteresis, fluid drag or fluid virtual mass drag damping, and $f_1(m\ddot{y}_1, m\ddot{y}_2)$ is the resultant time-varying force term acting on the object of the mass m.

A solution of the differential equation by the time series data is gained by conventional numerical calculation. For instance, as shown in FIG. 23, sampling the time series data of displacements, converting analog data to digital data, digitizing and convoluting wave data, analyzing a motion in a vibrating condition, and determining functions of $f_1$, $f_2$ and $f_3$, a mass m is calculated from measuring time series data of number N as follows, $$m[\ddot{y}] = mg - [(mg + kf_2(y-y_1+y_2)) - f_3(\dot{y}-\dot{y}_1+\dot{y}_2) + f_1(m\ddot{y}_1, m\ddot{y}_2)]$$

where the symbol [ ] represents a (degree of freedom × number of data) measurement matrix. Where the degree of freedom is n, and a data number is N, a measuring matrix has an (n×N) determinant. In general, the degree of freedom is one and the matrix is a (1×N) matrix. For example, assuming that the function $f_3$ is a Taylor's expansion, the following relation is gained, $$f_1(m\ddot{y}_1, m\ddot{y}_2) = C_{11}(m\ddot{y}_1) + C_{12}(m\ddot{y}_2) + C_{21}(m\ddot{y}_1)^2 + C_{22}(m\ddot{y}_1)(m\ddot{y}_2) + C_{23}(m\ddot{y}_2)^2 + C_{31}(m\ddot{y}_1)^3 + C_{32}(m\ddot{y}_1)^2(m\ddot{y}_2) + \ldots$$

DESCRIPTION OF THE PREFERRED EMBODIMENTS

Figure 1:
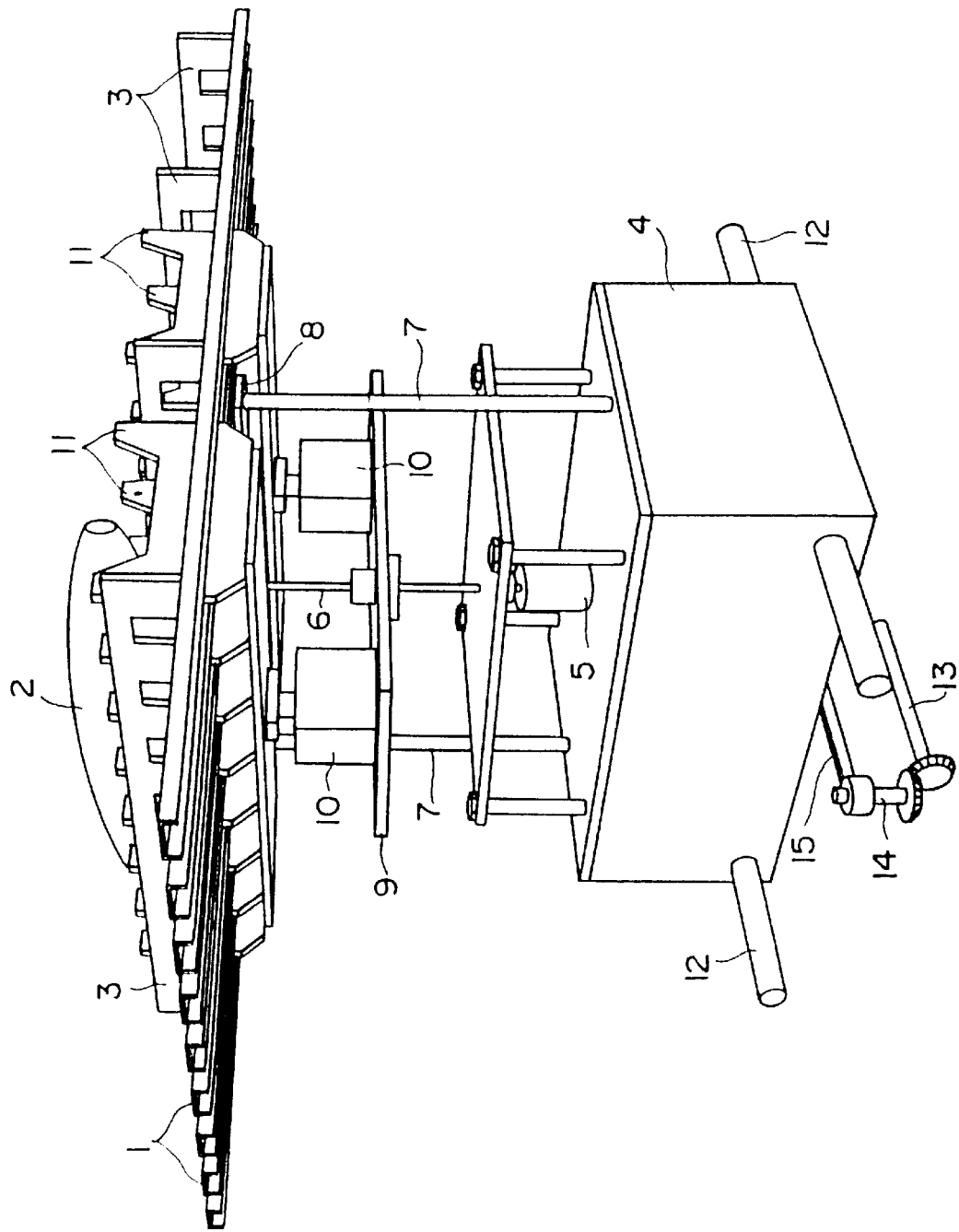
FIG. 1 shows partially a perspective and projection drawing of a measuring device using an apparatus for measuring a dynamic load in accordance with the present invention.
Figure 3:
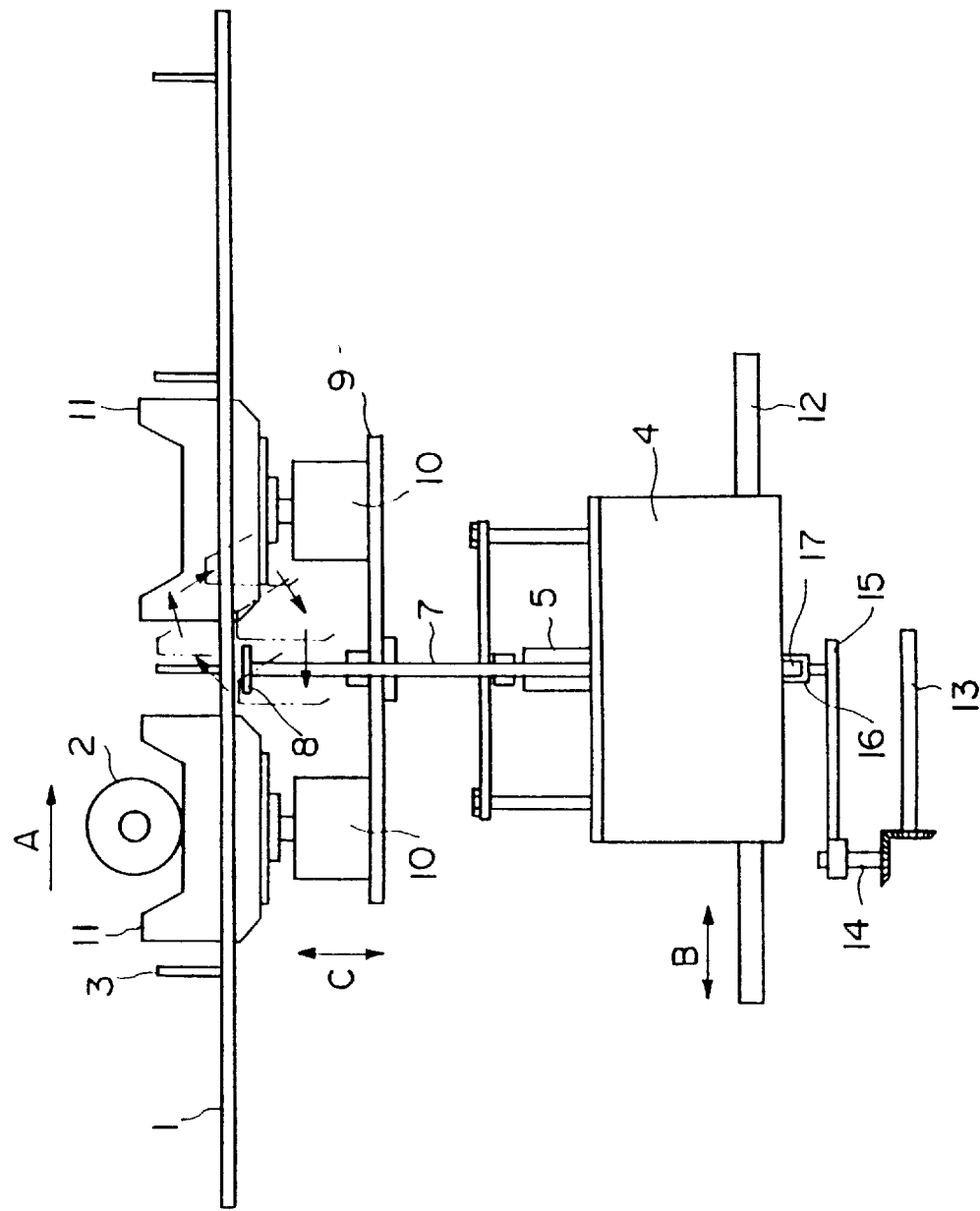
FIG. 3 shows a front elevation of the device as shown in FIG. 1.

The preferred embodiments of the present invention will be explained hereinafter by referring to figures. FIGS. 1 and 3 show partial drawings of measuring equipment using an apparatus for measuring a dynamic load in accordance with the present invention. In FIG. 1, number 1 is a guide rail, 2 is an object being measured, 3 is a carrier plate. The object being measured 2 is moved on the guide rails 1 by the carrier plate 3. The moving direction is left to right as shown by the arrows A—A in FIG. 3. The carrier plate 3 is supported by guide frames (omitted in FIG. 3). The carrier plate is driven in the direction of the arrow A by a winding mechanism. The guide rails 1 are fixed and are set up in parallel.

Figure 4:
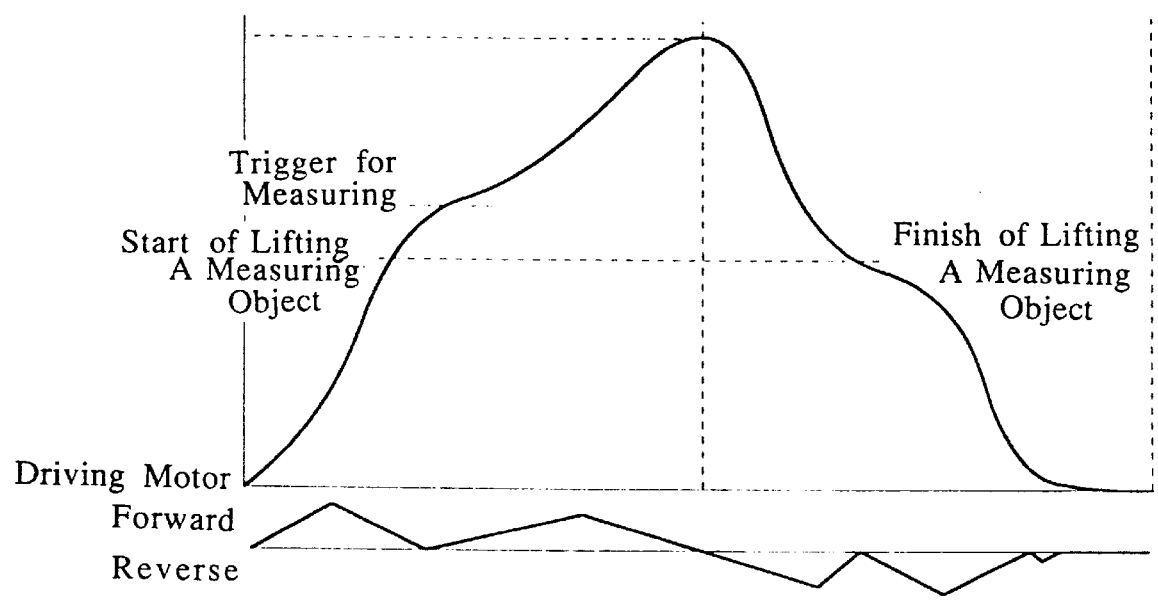
FIG. 4 shows a graph of the excited vibration of an apparatus for measuring a dynamic load of the device as shown in FIG. 1.

In FIGS. 1 and 3, 4 is a slide base, 5 is a driving motor, 6 is a screw shaft, 7 are stopper poles, 8 is a stopper plate, 9 is a base plate, 10 are sensing units of a Dynamic Load Sensor (in short, DLS), 11 are loading plates. The low end parts of the loading plates 11 are attached to the DLS.

The slide base 4 is supported by a pair of guide bars 12 which, move with a reciprocating motion in the direction of the arrow B in FIG. 3. A driving means provides a revolving transfer shaft 13 from a driving power machine (omitted from the figure), an intertransfer shaft 14, a transfer lever 15, a revolvable guide 16 attached to a leading end part of the transfer lever 15, and a guide rail 17 abutting to the bottom of the slide base 4, and being interlocked to the guide 16. The revolving motion provided by the driving means is transferred to the transfer lever 15 through the revolving transfer shaft 13, and the intertransfer shaft. This causes the transfer lever 15 to reciprocate horizontally, thereby providing reciprocating motion along the guide rail 17 while the guide 16 is revolving, (namely, the locus of the guide 16 is circular), consequently making the slide base 4 move with a reciprocating motion in the direction of the arrow B. The reciprocating period of the slide base 4 is synchronized to the interval and the moving velocity of the carrier plate 3 moving on the guide rails 1.

Figure 2:
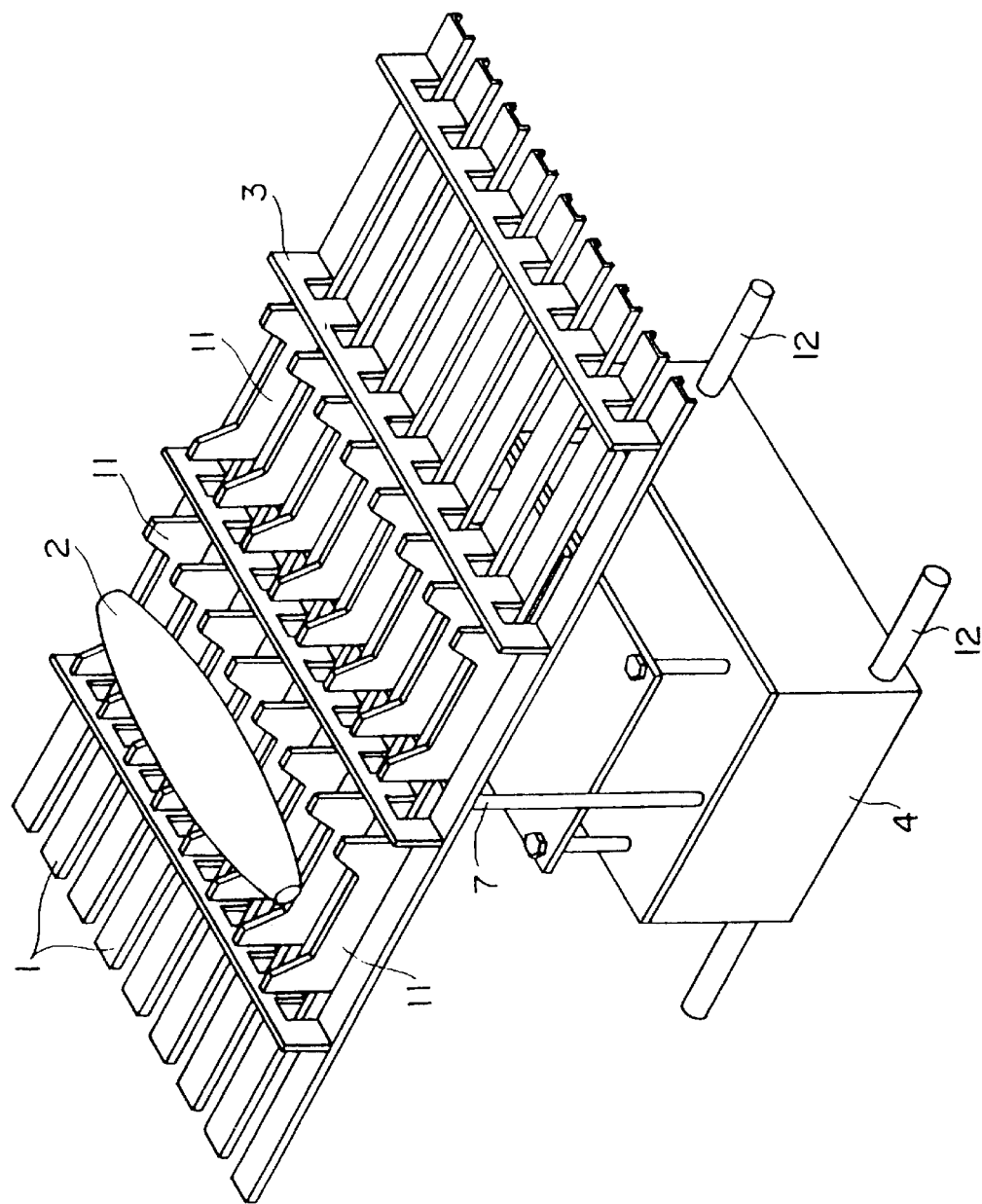
FIG. 2 shows an orthographic projection drawing of the device shown in FIG. 1.

The driving motor preferably revolves in synchronized operation of the reciprocating motion of the slide base 4, and drives the base plate 9 and the DLS 10 in a vertical direction (the direction of the arrow C in Figure). As a result, when the loading plates 11 protrude through the gaps of the guide rails 1, the guide plates support an object to be measured 2. The loading plate 11 rest the object 2 on the guide rails 1 when retracted below the guide rails 1. The measuring object 2 can thereafter be carried out down stream of the guide rails 1 by the carrier plate 3. FIGS. 1 and 2 show the top position of the loading plates 11 from the guide rails 1. The movement locus of the loading plates 11 is depicted by chain lines and arrows in FIG. 3. The stopper plate 8 does not touch a lower part of the guide rails 1 when the DLS 10 protrudes loading plates 11 though the guide rails 1. The carrier plate 3 is cut off at an interval of the guide rails 1 in order to avoid an interference between the loading plates 11 and the carrier plate 3.

Figure 5:
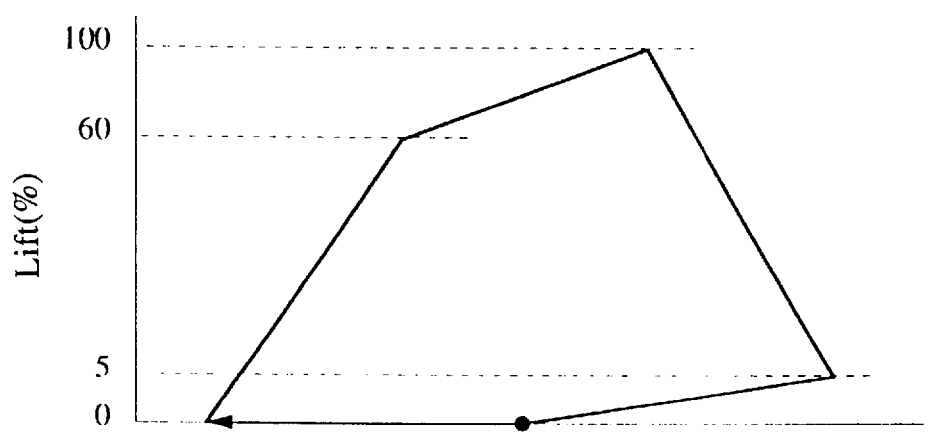
FIG. 5 shows a graph of a locus of the vibration of an apparatus for measuring a dynamic load of the equipment as shown in FIG. 1.
Figure 6:
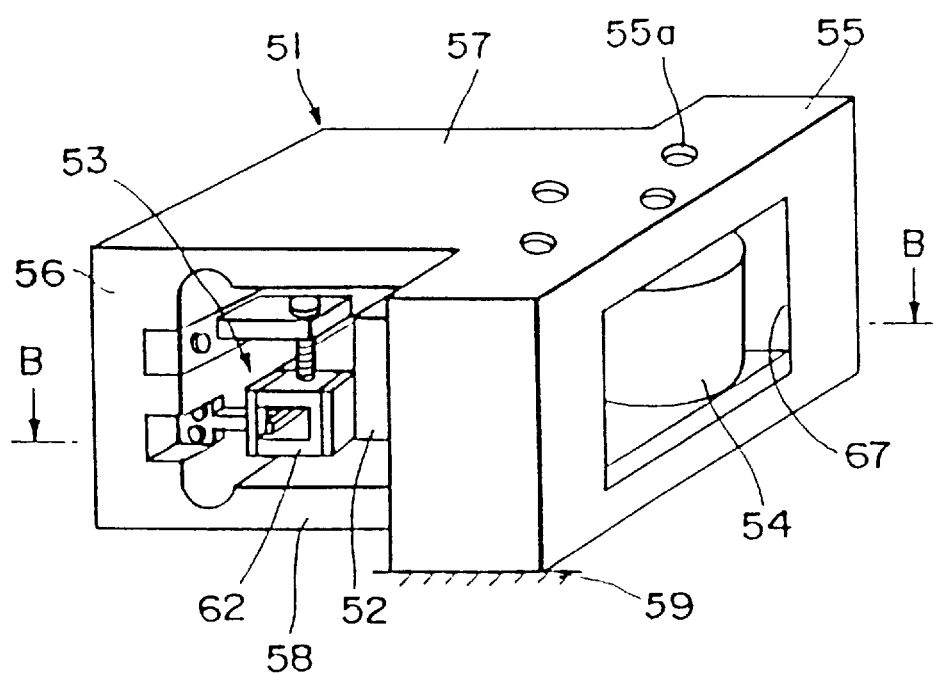
FIG. 6 shows a cross-eyed illustration of a frame body of an apparatus for measuring a dynamic load adopting the present invention.

FIG. 4 shows a graph of one period of the excited vibration with the reciprocating motion of the slide base 4 and with the vertical motion of the base plate 9. FIG. 5 shows an exemplary graph of a locus of the excited vibration. In this vibrating motion the loading plates 11 go up slowly in a first half of the period and go down quickly in a second half of the period. For instance, it is possible to revolve the revolving transfer shaft 13 with an irregular revolution rate by using an eccentric cam. Such motion seeks to shorten the measuring period. It is not essential or necessary to adopt this measuring method in the present invention. Nor is the present invention restricted to a measuring method or the measuring equipment as mentioned above.

The DLS 10 can be the one disclosed by the present inventors have in PCT/JP91/01168 and PCT/JP92/01094. The DLS 10 measures a load when the loading plates 11 are in a position above the guide rails 1. The structure and measuring operation of the DLS 10 will be explained in detail hereinafter in reference to FIGS. 6 through 9.

The DLS 10 of the present invention provides a frame body 51, an arm body 52, a load detection sensor 53 and an acceleration detection sensor 54. The frame body 51 has a rectangular hollow frame shape and provides a fixed column 55 with a large cross section, a movable column 56 that is opposed to the fixed column 55 and upper and lower frame girders 57 and 58 that are connected with the both columns 55 and 56. The fixed column 55 is set upon a base 59, the movable column 56 that is acted on by a measuring load is a free edge such as a cantilever beam. It is also possible that the fixed column 55 is set below a base 59, and the top upper plane side of the fixed column 55 has bolt-holes 55a as shown.

The arm body 52 is arranged in a hollow interior 60 of the frame body 51 and toward the movable column 56 in that a housing 63 of a load detection sensor 53 is set up. The load detection sensor 53 includes a light emitting element 63 and a one dimensional position detection sensor such as a semiconductor pin-photo diode ( in short, PPD ) 64 within the housing 62. A bar-mask 66 is inserted into a position between the light emitting element 63 and the PPD 64 from the edge of the stay 65 fixed to the movable column 56. If the PPD 64 receives an incident ray from the light emitting element 63, the PPD unit 64 generates a current in proportion to the light receiving area and the intensity of the light ray. If a position of the bar-mask 66 is changed by a deflection of frame-beams 57 and 58 acted on by a load on the movable column 56, the change of position is indicated by an output generated by the PPD 64.

Figure 10:
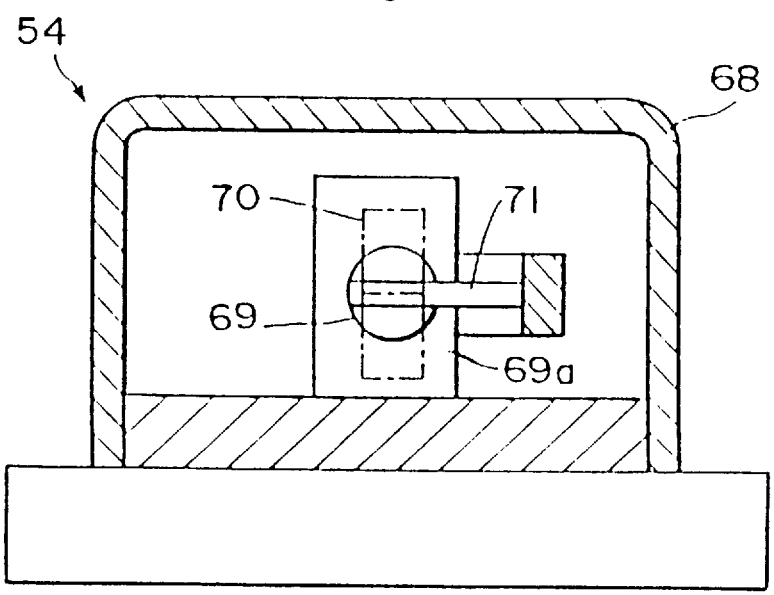
FIG. 10 shows a C—C cross section of FIG. 9.

The acceleration detection sensor 54 includes a light emitting element 69 and a one dimensional position detection sensor, such as a semiconductor pin-photo diode 70, set up in an inner hollow portion 67. Within a cover 68, the light emitting element 69 is opposed to the PPD unit 70. A thin movable bar-mask 71 is attached to a support block 69a and is inserted into a portion between the light emitting element 69 and the PPD 70. When the PPD unit 70 receives an incident light from the light emitting element 69, the PPD unit 70 generates a current in proportion with the light receiving area and the intensity of the light ray. The thin movable bar 71 can vibrate in a vertical direction in FIG. 10, with the frame body 51 and the base 59. If the light receiving area of the PPD unit 70 is offered by the vibrations of the thin bar 71, it results in a change in the current output continuously by the PPD 70.

The principle of a position detection using by the PPD will be explained hereinbelow.

Figure 11A:
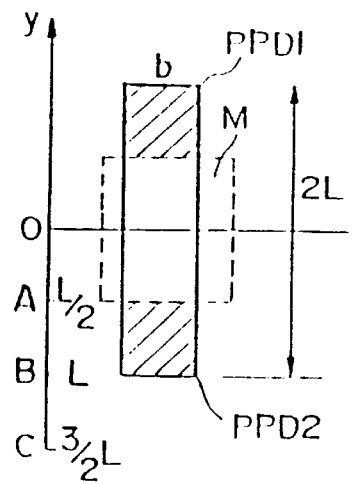
FIG. 11A shows a principle of a position detection sensor using pin photo diodes.
Figure 11B:
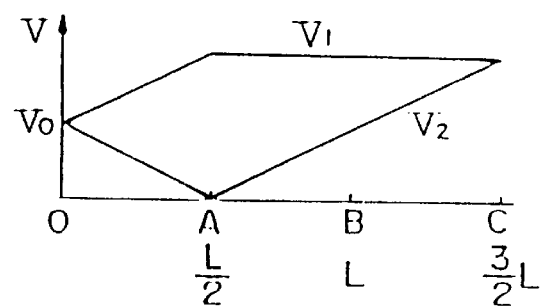
FIG. 11B shows a position relation between a mask and an output voltage of a position placement detector.

FIG. 11(A) shows a position relation between a mask M and PPDs, and FIG. 11(B) shows a position relation of a mask M and output voltage of a PPD. As is well-known, a PPD unit is an element whose output voltage is in proportion with a light receiving area and an intensity of incident light. It is clear that the PPD unit is not operated only as a position detection element. The present invention can be operated using a PPD unit as a position detection element by adding a mask M to a PPD unit that includes elements PPD 1 and PPD 2 and arranged within a thin gap.

Assuming that the output voltages of elements PPD1 and PPD2 are V1 and V2, respectively, displacement from the center of the PPD unit O to the center of the mask M is 1, a position of the mask M is calculated from the following relations, When the center of a mask M is between O–A, such that $0 \leq 1 \leq L/2$ where 1 is a displacement, $$1 = \frac{V1 - V2}{V1 + V2} \cdot \frac{L}{2}$$

When the center of a mask M is between A–C, such that $L/2 \leq 1 \leq 3L/2$, $$1 = \frac{V2}{V1} \cdot L + \frac{L}{2}$$

If an intensity I of a light ray is constant, the output voltage V1 and V2 of elements PPD1 and PPD2 are only dependent on the position of the mask M. It is possible to use PPD units as a position detection sensor by calculating the center position of the mask M from the above related position detection element using the aforementioned relation.

A case that the intensity of the light lay changes will be considered hereinbelow. The variation dV of the output voltage of elements PPD1 and PPD2 is in proportion with the variation dI of the intensity of the light lay under the condition that the intensity of the light lay is changing. If the characteristics of elements PPD2 are and PPD 1 is the same, the variation dV of output voltage between PPD1 and PPD2 is the same under the same conditions. If the variation of the intensity of light is only dependent on the variation $dV_{LED}$ of the light emitting power $V_{LED}$ of the light emitting element, the variation is in proportion with the variation of light power.

When the center of a mask M is between positions, O–A, the displacement 1 is calculated from the following equations, $$1 = \frac{\left(V1 + V1 \frac{dI}{dt}\right) - \left(V2 + V2 \frac{dI}{dt}\right)}{\left(V1 + V1 \frac{dI}{dt}\right) + \left(V2 + V2 \frac{dI}{dt}\right)} \cdot \frac{L}{2}$$

$$= \frac{(V1 - V2) - \left(1 + \frac{dI}{dt}\right)}{(V1 + V2) + \left(1 + \frac{dI}{dt}\right)} \cdot \frac{L}{2}$$

$$= \frac{(V1 - V2)}{(V1 + V2)} \cdot \frac{L}{2}$$

When the center of a mask M is between positions, A–C, the displacement 1 is calculated from the following equations, $$1 = \frac{\left(V2 + V2 \frac{dI}{dt}\right)}{\left(V1 + V1 \frac{dI}{dt}\right)} \cdot L + \frac{L}{2}$$

$$= \frac{V2}{V1} \cdot L + \frac{L}{2}$$

From above analysis the influence from a change of light power can be removed and, as a result, the PPD units can be used as a position detection sensor. If the PPD units can detect a position, an acceleration can be calculated from a second-order derivative with respect to time, thereby making the PPD units useful as an acceleration detection sensor.

Figure 12:
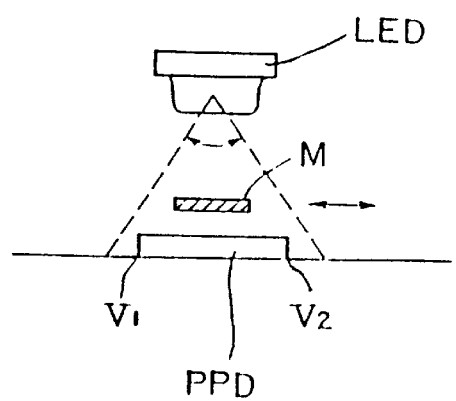
FIG. 12 shows an exemplary preferred embodiment of a position detection sensor using pin photo diodes.
Figure 13:
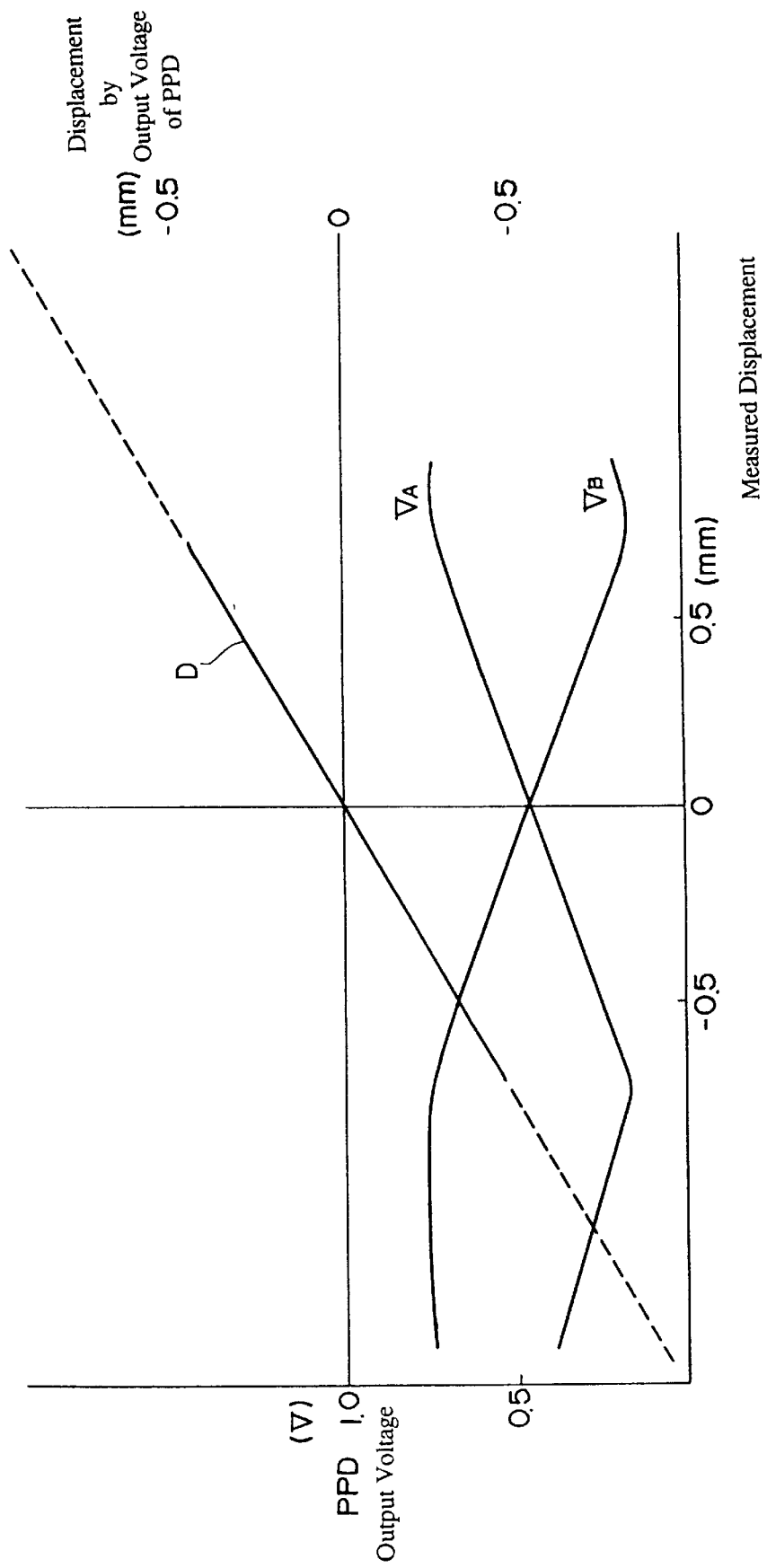
FIG. 13 shows a graph of a measurement result of the exemplary preferred embodiment.

FIG. 12 shows a principle drawing of a one dimensional position detection arrangement that uses a PPD. A microdisplacement can be detected by a mask M that is inserted into between LED and PPD. The mask M can be moved by any device such as a micrometer. Output voltages V1 and V2 of elements PPD are measured and exemplary measurement results are shown in FIG. 13. The displacement D indicated by an output voltage of the PPD is a linear curve. It has been found that the PPD can be useful as a position detection sensor. An exemplary width of the mask M in FIG. 12 is 1.5 mm and an exemplary width of the PPD is 3.0 mm.

Figure 7:
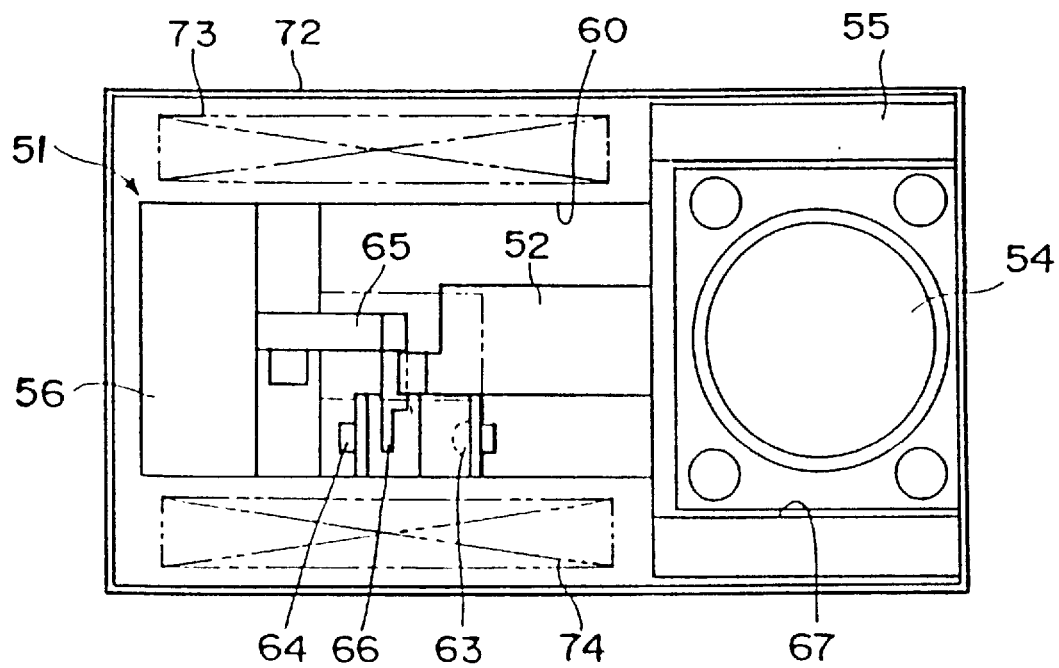
FIG. 7 shows a cross section of B—B as shown in FIG. 6.
Figure 8:
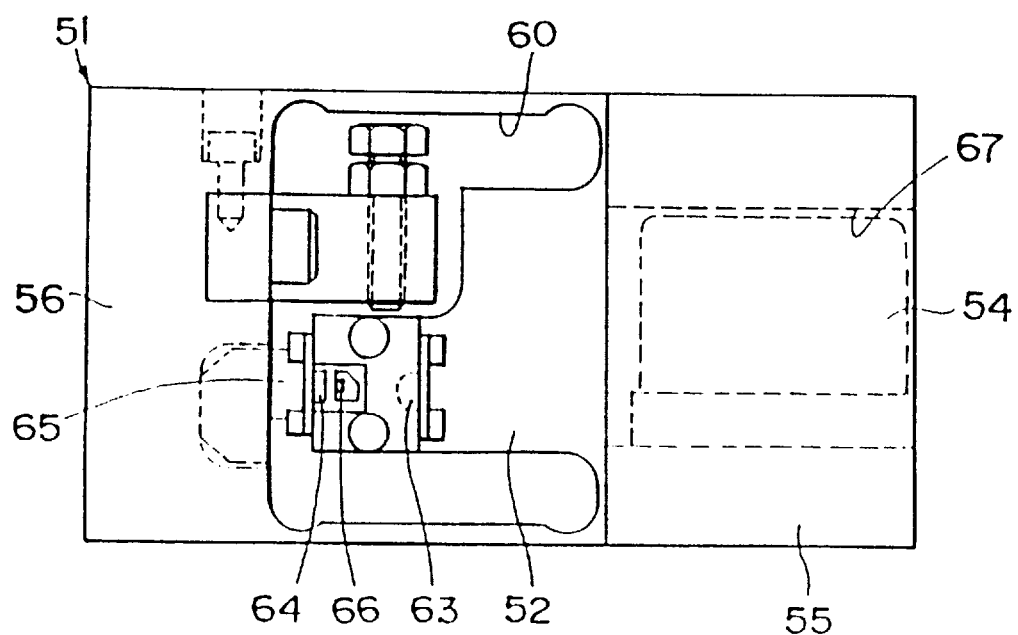
FIG. 8 shows an enlarged side elevation of the frame body as shown in FIG. 6.
Figure 9:
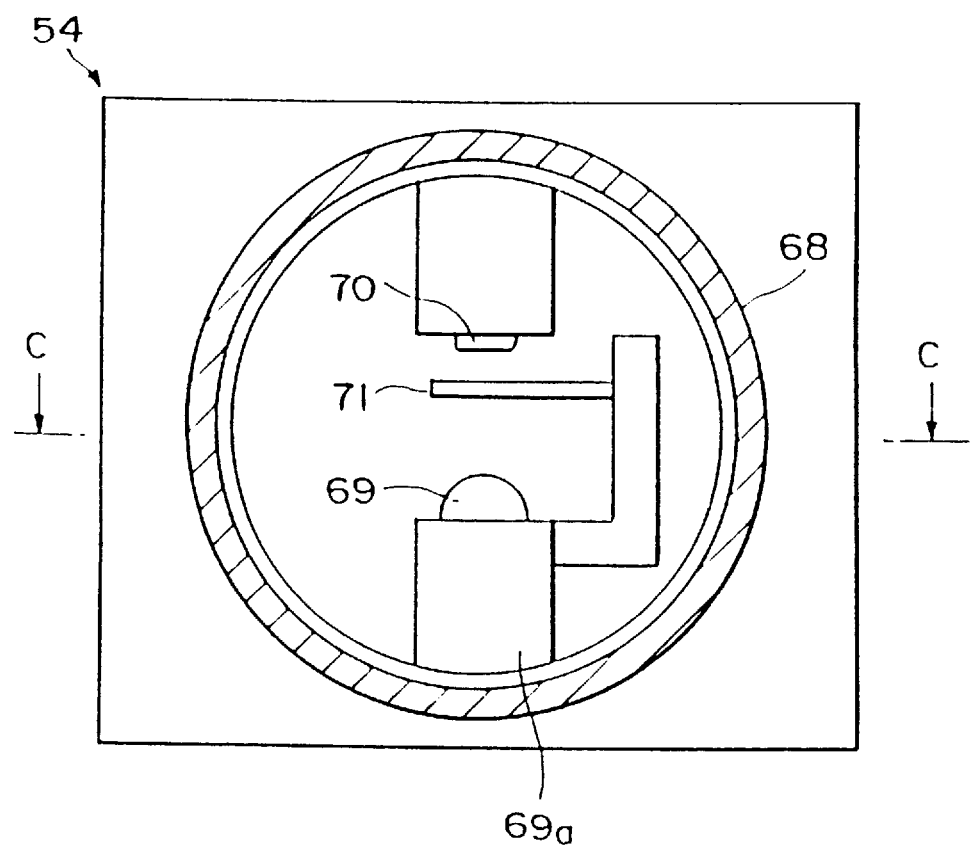
FIG. 9 shows an enlarged plane elevation of an acceleration detection sensor set up in the frame body as shown in FIG. 6.

An electrical circuit composition of the DLS 10 will be described as follows. Printed circuit boards 73 and 74 are set up as shown in FIG. 7. The printed circuit boards 73 and 74 provide, for example, two or more blocking-layer boards and provide two circuit of the PPD 64 and a light emitting element 63 in a load detection sensor 53, and a PPD 70 and a light emitting element 69 in the light detection sensor 54, respectively.

Figure 14:
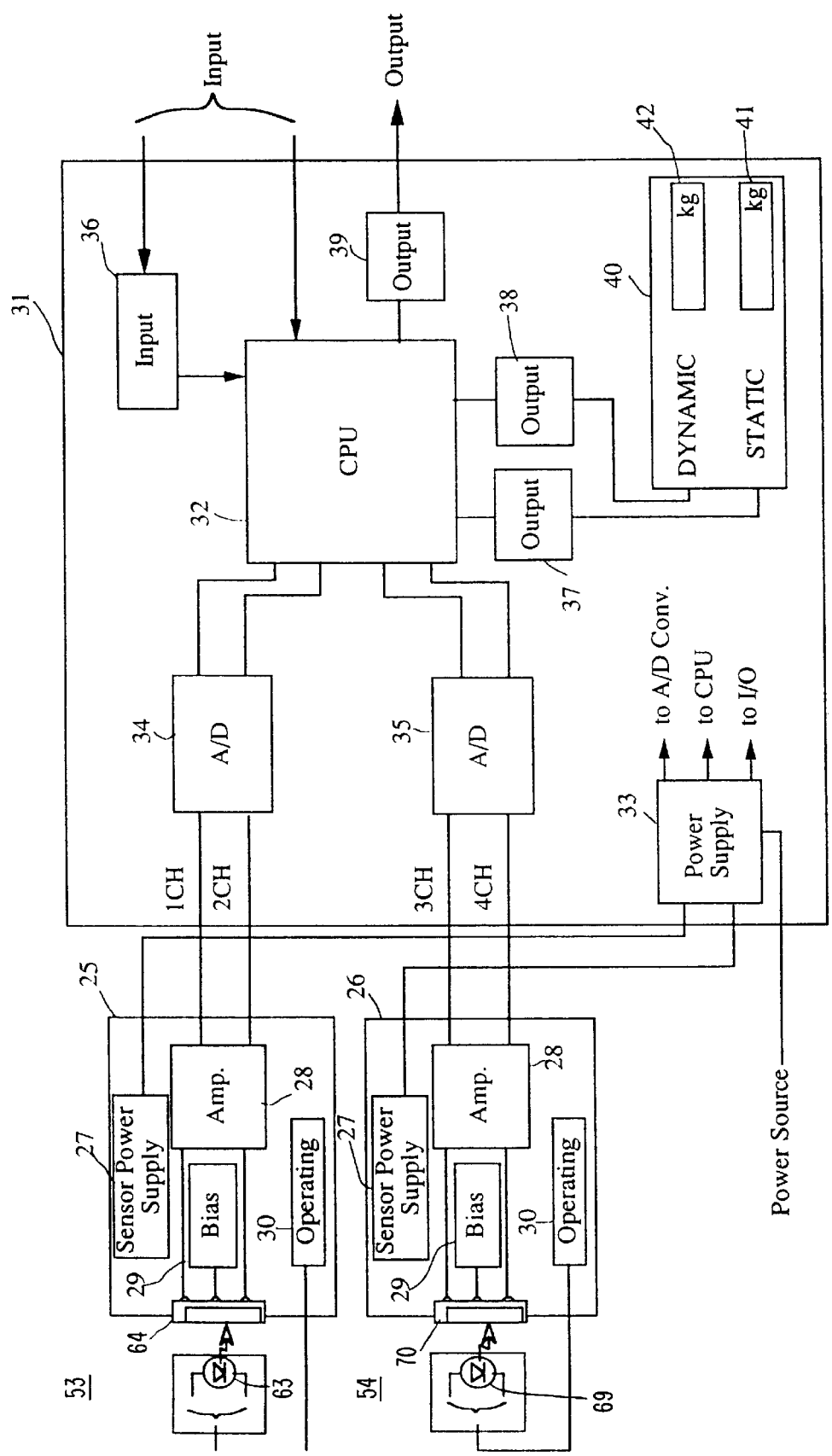
FIG. 14 shows a circuit composition layout of an apparatus for measuring a dynamic load adopting the present invention.

The load detection circuit 25 and the acceleration circuit 26 in FIG. 14 have the same circuit composition and provide sensor power supply circuits 27, current amplification circuits 28 that amplify position detection outputs by PPDs 64 and 70, bias circuits 29 for outputs of PPD 64 and 70, and operating circuits 30 for light emitting elements, respectively. The detection circuits 25 and 26 are connected with an analyzing unit 31. The analyzing unit 31 includes a CPU 32, a power supply 33, two A/D converters 34 and 35, an input circuit 36, three output circuits 37, 38 and 39 and a display circuit 40. The analyzing unit 31 can take many forms, for instance, attaching the analyzing unit to the fixed column 55 of the frame body 51 or to an arm-body 52, setting up a unit analyzer outside of the frame body 51 or to an arm-body 52, attaching a part of a analyzing unit to the fixed column 55 of the frame body 51 and setting up a part of a unit analyzer outside of the sensing equipment.

The power supply circuit 33 is connected with an outside power supply and supplies power to: a sensor power supply circuit 27 in the detection sensor circuits 25 and 26, a CPU unit 32, a A/D converter 34, an input circuit 36, three output circuits 37,38 and 39 and a display circuit 40. A/D converters 34 and 35 are connected with detection circuits 25 and 26 of the PPD units 64 and 70 via the current amplification circuits 28, and input analog data from the A/D converters 34 and 35 of the current amplification circuit 28 to the CPU unit 32. An interface circuit of input signals is not shown in this case. The output circuit 37 is connected to the display 41 of measurement loads in the display circuit 40, the output circuit 38 is connected to the display 42 of a dynamic load in the display circuit 40, and the output circuit 39 is an external output.

In the present preferred embodiment load measuring is always done in the mode when the DLS 10 is moving positions. In the analyzing unit 31, the mass m of the being measured is calculated from the following equation, $$m[\ddot{y}] = mg - [(mg + kf_2(y - y_1 + y_2)) - f_3(\dot{y} - \dot{y}_1 + \dot{y}_2) + f_1(m\ddot{y}_1, m\ddot{y}_2)]$$

where $\dot{y}_1$ and $\ddot{y}_1$ are the velocity and the acceleration of vibration of the base 59 respectively. The first-order and the second-order derivatives are with respect to time from the displacement $y_1$ by measuring the output of the PPD 70 which is the displacement of the fixed column 55 excited by the vibration of the base plate 9 and the DLS 10 itself. The components $\dot{y}_2$ and $\ddot{y}_2$ are the velocity and the acceleration of vibration of the movable column 56 of the frame body 51 respectively, getting the first-order and the second-order derivatives with respect to time from the displacement $y_2$ by measuring the output of the PPD 64 which is the displacement of the movable column 56. As above mentioned, the term $kf_2(y-y_1l+y_2)$ is the material term of the component structure of the spring mass system, k is a spring constant, $f_3(\dot{y}-\dot{y}_1+\dot{y}_20$ is the damping term such as viscous friction, coulomb, hysteresis, fluid drag or fluid virtual mass drag damping, and $f_1(m\ddot{y}_1, m\ddot{y}_{21})$ is being the resultant time-varying forces term acting on the object of the mass m.

Figure 24:
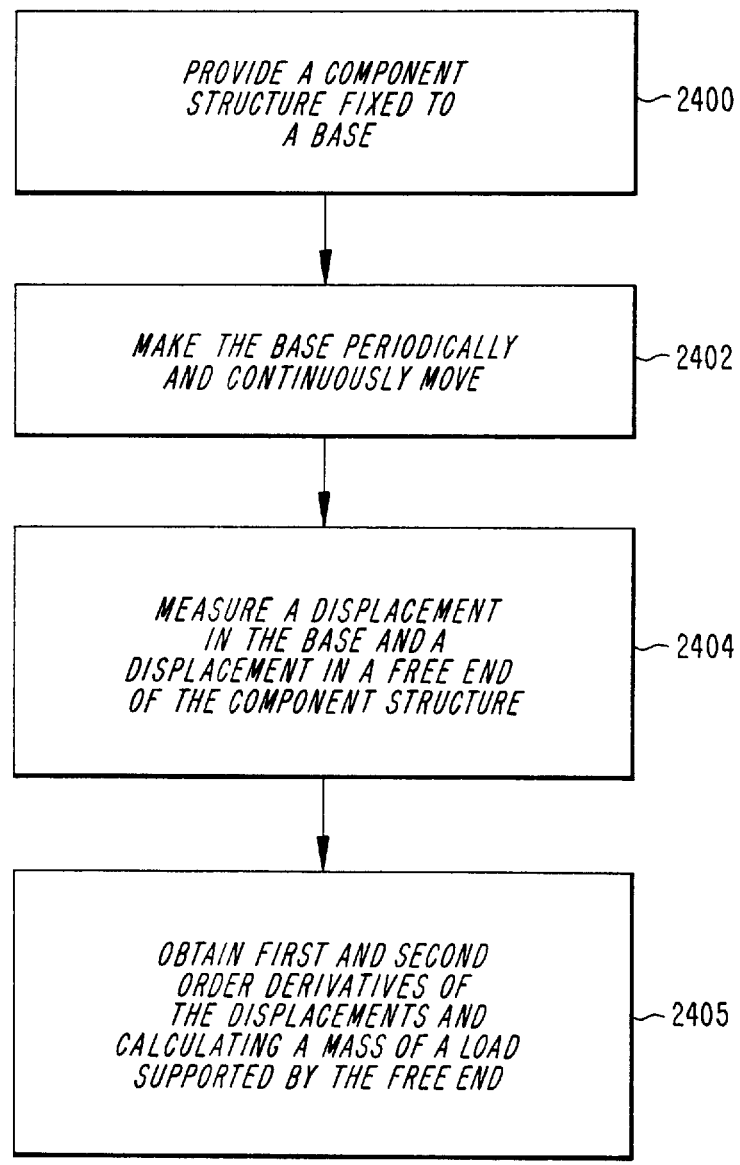
FIG. 24 depicts and exemplary process in accordance with the present invention.

As shown in FIG. 24, the present invention involves a method for measuring the mass of a dynamic load. The method comprises the following steps: a first step 2400 of providing a component structure fixed to a base, the base comprising a non-spring mass system and the component structure comprising a spring mass system having one end that is fixed to the base and a free end for receiving a working load; a second step 2402 of making the base periodically and continuously move, thereby providing resultant motion within the component structure in the spring mass system; and a third step 2404 of continuously measuring the displacement $y_1$ of the base and the displacement $y_2$ of the free end of the spring mass system. The method further includes fifth and sixth steps 2405 of obtaining first-order derivatives $\dot{y}_1$ and $\dot{y}_2$ and second-order derivatives $\ddot{y}_1$ and $\ddot{y}_2$ from the displacement $y_1$ and $y_2$ with respect to time and calculating the mass m according to the equation identified in the preceding paragraph.

Figure 15:
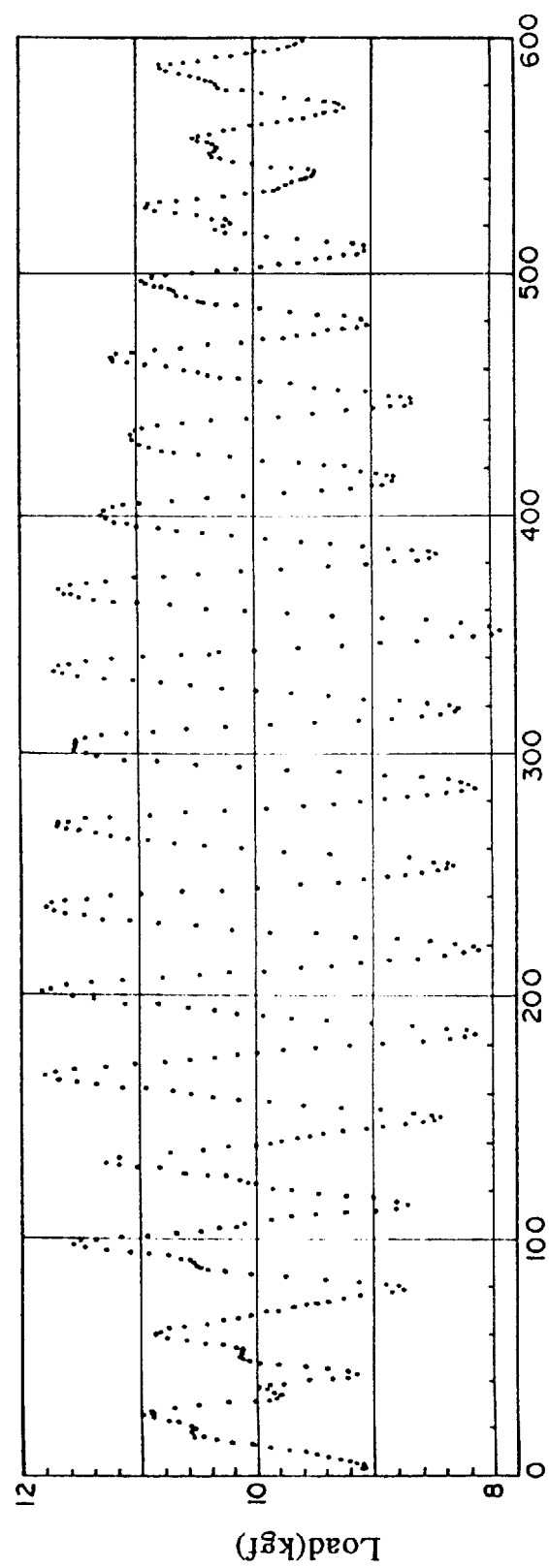
FIG. 15 shows a graph of a measurement result including a disturbance using a method and an apparatus for measuring a dynamic load adopting the present invention.
Figure 16:
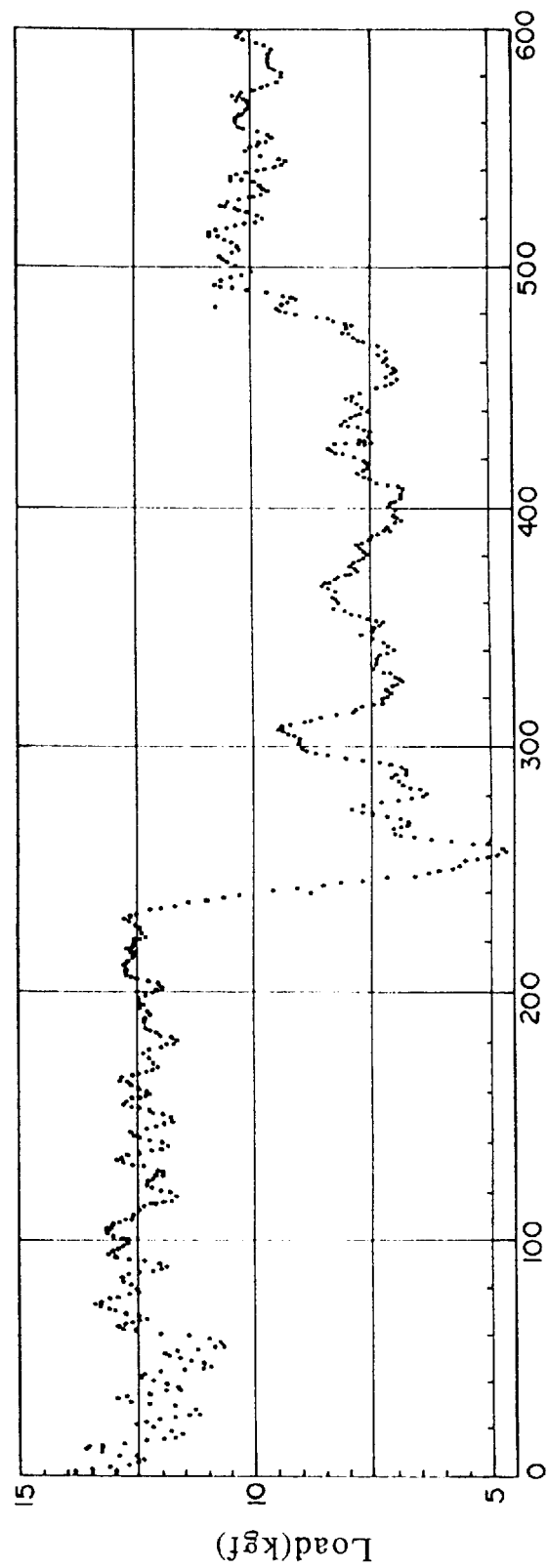
FIG. 16 shows a graph of measuring result except a disturbance from the measurement result in FIG. 15.
Figure 17:
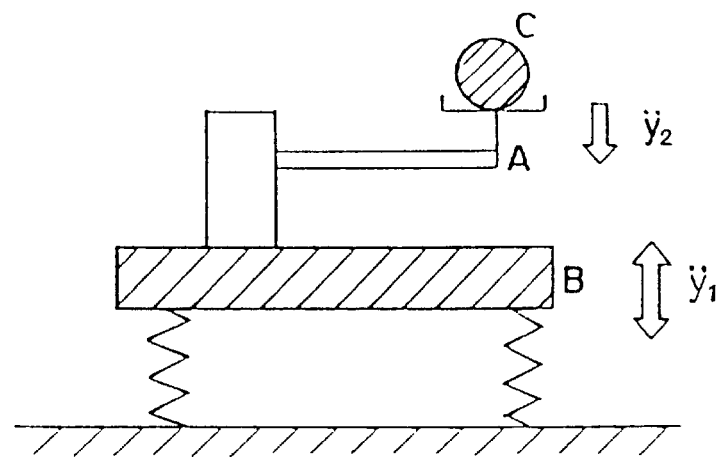
FIG. 17 shows general layout 11 illustrating sensing unit of an apparatus for measuring a dynamic load that is set up on a time varying oscillating and vibrating base, reference A shows an apparatus composition, reference B shows a direction of change when a load acts on the sensor assembly.
Figure 18A:
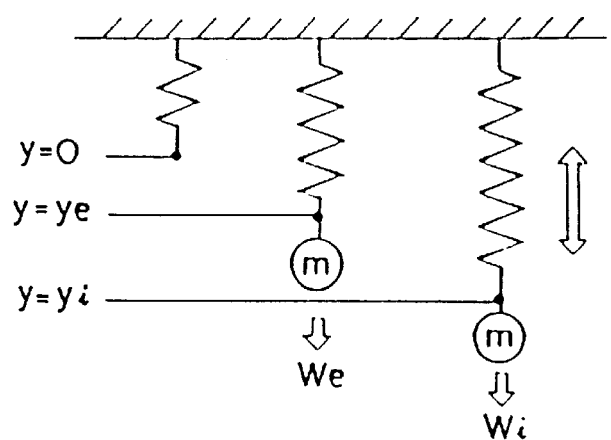
FIG. 18(A) shows illustrations to explain a principle of a method for measuring a dynamic load and shows a relation between a load and a displacement in a spring mass system.
Figure 18B:
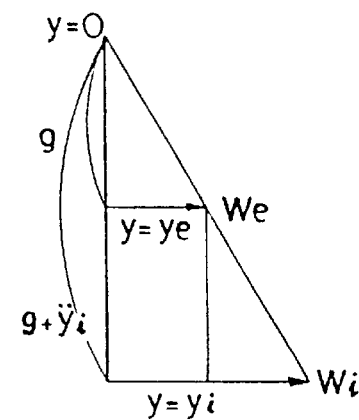
FIG. 18(B) shows a relation between a rest load and an instant load and a relation between a displacement and their loads in a spring mass system.
Figure 19:
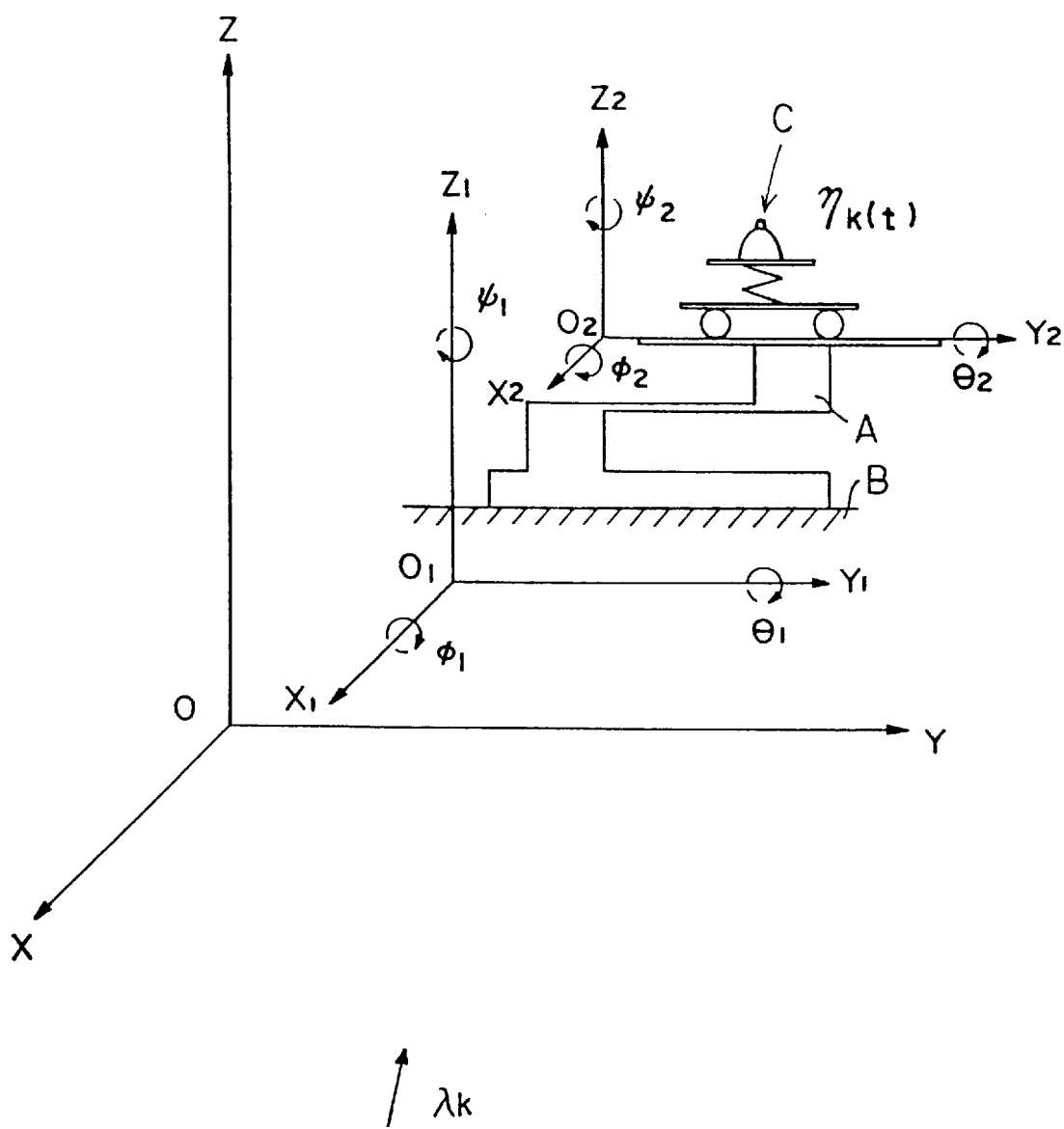
FIG. 19 shows an illustration to explain a method for measuring a dynamic load according to the present invention and a load measuring principle of an apparatus for measuring a dynamic load according to the present invention, wherein a sensor assembly base and a measured object can move in three dimensions.
Figure 20:
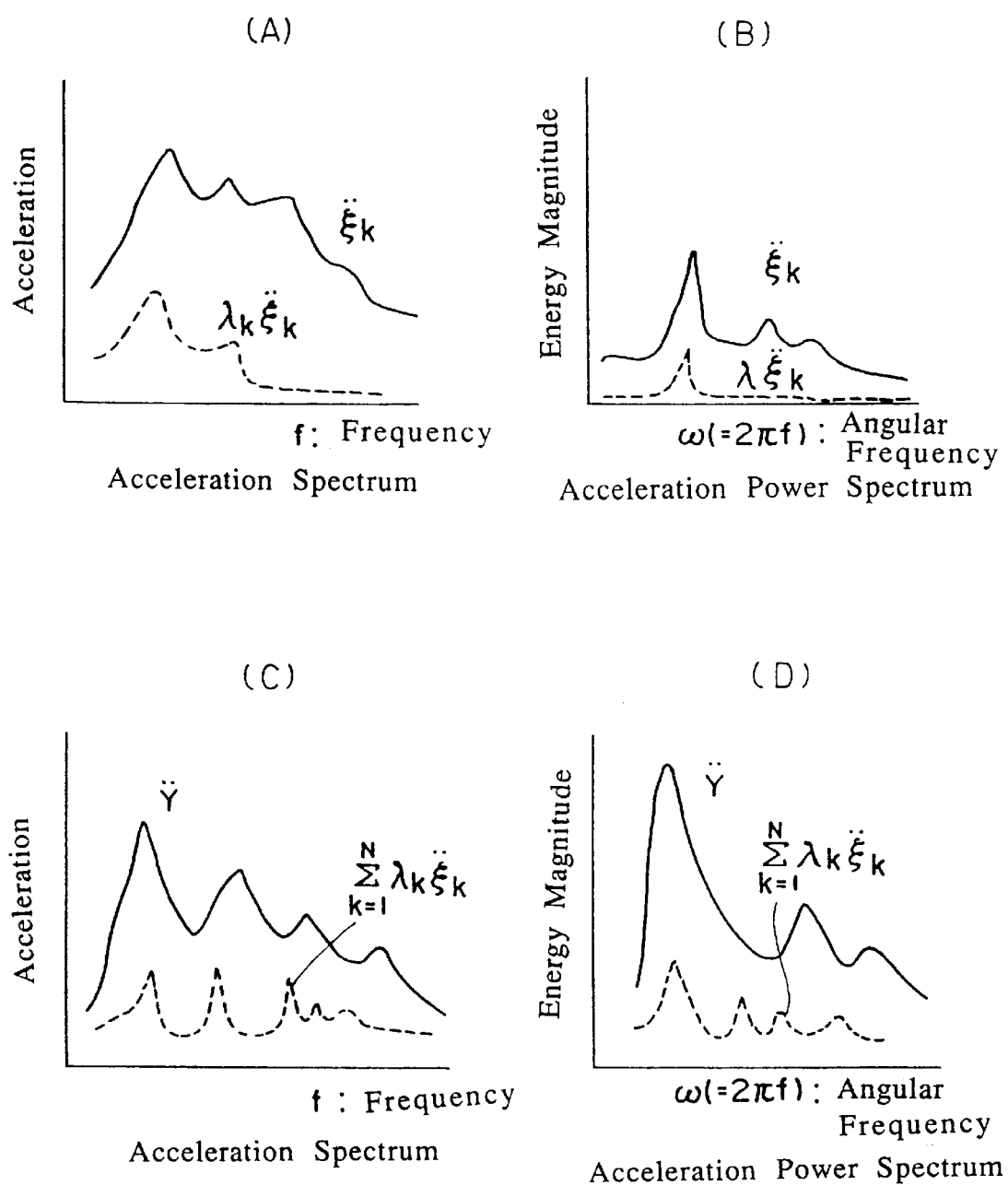
FIG. 20 shows illustrations of an acceleration spectrum and a power spectrum of a wave of the vibrating condition in FIG. 19.
Figure 21:
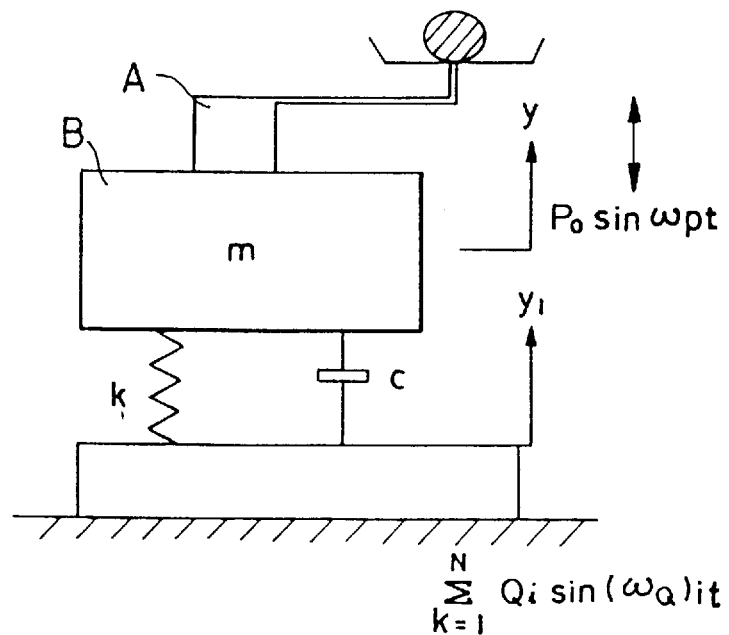
FIG. 21 shows an illustration to explain a method for measuring a dynamic load adopting the present invention and a load measuring principle of an apparatus for measuring a dynamic load adopting the present invention, an illustration of a one-degree spring mass system.
Figure 22:
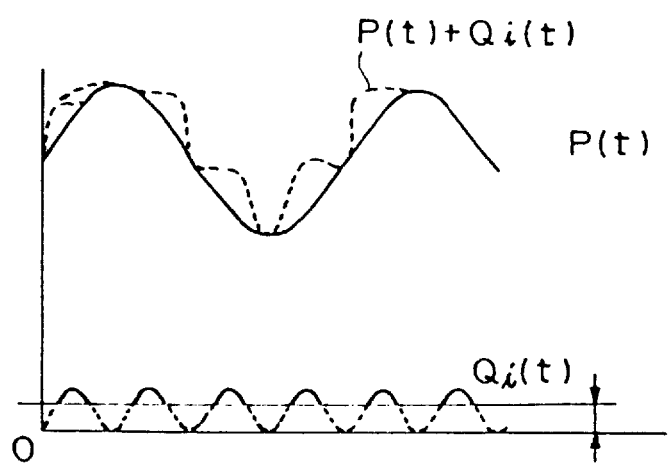
FIG. 22 shows an illustration to explain a method for measuring a dynamic load adopting the present invention and a load measuring principle of an apparatus for measuring a dynamic load adopting the present invention, an illustration of an elimination effect of a disturbance excited by an impressed forced vibration.
Figure 23:
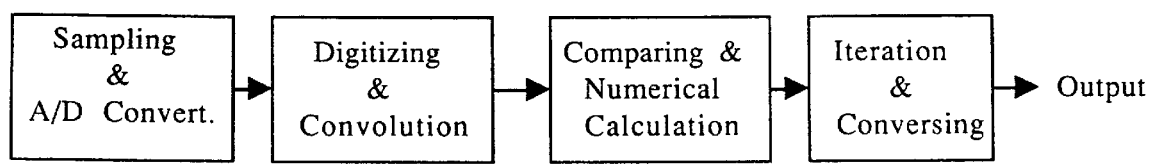
FIG. 23 shows an illustration to explain a method for measuring a dynamic load adopting the present invention and shows conceptually a block diagram of a load data analyzing process of an apparatus for measuring a dynamic load adopting the present invention.

The calculated results of the preferred embodiments will be now explained. FIG. 15 shows one example of a graph of a load (mg) calculated from the measurement displacements $y_1$ and $y_2$ when a measuring object 2 (mg=10 Kg) is supplied on the guide rails 1 and the slide base 4 and the loading plates 11 are made to move very slowly under vibrating conditions excited by disturbances such as a driving motor etc. FIG. 16 shows one example of a graph of a load (mg) when the slide base 4 and the loading plates 11 are made to move very quickly with a very short period.

In FIG. 15 the influence of the disturbance appears in the measuring data. In FIG. 16 the effect of vibrating conditions of the DLS 10 only appears the measuring data. It is evident that in FIG. 16 the influence of the disturbance, such as a driving motor etc. doesn't appear in FIG. 15 doesn't appear the measuring data. In FIG. 15 the measuring results are the maximum instant load of 11.827 Kgf and the minimum constant load of 7.913 Kgf and the calculated load by the analyzing method of the present invention is 10.001 Kgf. In FIG. 16 the measuring results are the maximum instant load of 13.924 Kgf and the minimum instant load of 4.677 Kgf and the calculated load by the analyzing method of the present invention becomes 10.000 Kgf.

As a result, it can be concluded that it is possible to get measuring loads with very high accuracy without being affected by shaking, oscillating and vibrating conditions excited by the apparatus itself and the external environment, giving the DLS 10 the external forces with large periods and making the DLS 10 vibrate.

As mentioned above, the method and apparatus for measuring dynamic load adopting the present invention proves that it is possible to do a dynamic load measurement with very high accuracy under the oscillating and vibrating conditions excited by the apparatus itself and the external environment without being affected by their oscillating and vibrating conditions, making the equipment elements of measuring a dynamic load move, vibrate and do with the resultant motion positively.

BRIEF DESCRIPTION OF SYMBOLS 1 guide rail
2 measuring object
3 carrier plate
4 slide base
5 driving motor
6 screw shaft
9 base plate
10 sensing unit of Dynamic Load Sensor (DLS)
11 loading plate
12 guide bar
13 revolving transfer shaft
15 transfer lever
25 load detection circuit 26 acceleration detection circuit
31 analyzing unit
51 frame body
52 arm body
53 load detection sensor
54 acceleration detection sensor
55 fixed column
56 movable column
63, 69 light emitting element
64, 70 PPD

We claim:

1. A method for measuring the mass of a dynamic load, the method comprising the steps of:

providing a component structure fixed to a base, said base being comprised of a non-spring mass system, said component structure comprising a spring mass system having one end that is fixed to said base and a free end for receiving a working load;

making said base periodically and continuously move thereby providing resultant motion within said component structure and said spring mass system;

continuously measuring a displacement $y_1$ of said base and a displacement $y_2$ of said free end of said spring mass system;

obtaining the first-order derivatives $\dot{y}_1$ and $\dot{y}_2$ and the second-order derivatives $\ddot{y}_1$ and $\ddot{y}_2$ from said displacements $y_1$ and $y_2$ with respect to time; and calculating the mass m of said load according to the equation:

$$m[\ddot{y}]=mg-[(mg+kf_2(y-y_1+y_2))-f_3(\dot{y}-\dot{y}_1+\dot{y}_2)+f_1(m\ddot{y}_1,m\ddot{y}_2)]$$

where the symbol [ ] represents a matrix whose determinant is (a number of degree of member freedom×a number of data measurements), g is gravitational acceleration, $kf_2(y-y_1+y_2)$ is a material term of the component structure of the spring mass system, k is a spring constant, $f_3(\dot{y}-\dot{y}_1+\dot{y}_2)$ is a damping term selected from the group consisting of: viscous friction, coulomb, hysteresis, fluid drag and fluid mass drag damping, and $f_1(m\ddot{y}_1, m\ddot{y}_2)$ is a resultant time-varying forces term acting on the object having the mass m.

2. The method for measuring the mass of a dynamic load according to claim 1, wherein the resultant motion is in a direction of working a load on the free end part of said spring mass system.

3. An apparatus for measuring the mass of a dynamic load, the apparatus comprising:

a base comprised of a non-spring mass system;

a frame body comprised of a spring mass system having one end that is fixed to said base and a free end;

a vibrating means for periodically and continuously vibrating said base and said frame body;

a first displacement sensor for measuring a displacement $y_1$ of said base as excited from vibrations and oscillations originating at a fixed end part of said frame body, a second displacement sensor for measuring a displacement $y_2$ of said free end part of said frame body; and an analyzing unit by which a mass of a load acting on said free end part is calculated from the displacements $y_1$ and $y_2$;

said analyzing unit obtaining the first-order derivatives $\dot{y}_1$ and $\dot{y}_2$ and the second-order derivatives $\ddot{y}_1$ and $\ddot{y}_2$, with respect to time, from said displacements $y_1$ and $y_2$, the mass m of said load being calculated according to the equation:

$$m[\ddot{y}]=mg-[(mg+kf_2(y-y_1+y_2))-f_3(\dot{y}-\dot{y}_1+\dot{y}_2)+f_1(m\ddot{y}_1,m\ddot{y}_2)]$$

where the symbol [ ] represents a matrix whose determinant is (a number of degree of member freedom×a number of data measurements), g is gravitational acceleration, $kf_2(y-y_1+y_2)$ is a material term of the component structure of the spring mass system, k is a spring constant, $f_3(\dot{y}-\dot{y}_1+\dot{y}_2)$ is a damping term selected from the group consisting of: viscous friction, coulomb, hysteresis, fluid drag and fluid mass drag damping, and $f_1(m\ddot{y}_1, m\ddot{y}_2)$ is a resultant time-varying forces term acting on the object having the mass m.

4. The apparatus for measuring the mass of a dynamic load according to claim 3, wherein said vibrating means vibrates said base in the direction of in a direction of working a load on the free end part of said spring mass system.

5. The apparatus for measuring the mass of a dynamic load according to claim 3, wherein each of the first and the second displacement sensors comprises:

a light-emitting element;

a one dimensional position detection element which includes a pair of semiconductor pin-photo diode elements arranged with a gap therebetween, and a spring-bar element positioned in a space between said light-emitting element and said one dimensional position detection element;

at least one of said light-emitting elements and said one dimensional position detection elements being fixed at a free end part of said frame body, the other being set up in a fixed end part of said frame body, one edge of said spring-bar element being fixed to at least one of a free end part and a fixed end part of said frame body, masking a portion of said one dimensional position detection element using said spring-bar element, said one dimensional position detection element generating a current that is proportional to an intensity of incident light from said light-emitting element as said incident light is affected by the vibration and consequent masking of said spring-bar.

6. The apparatus for measuring the mass of a dynamic load according to claim 5, wherein said vibrating means vibrates said base in the direction of in a direction of working a load on the free end part of said spring mass system.

* * * * *